United States Patent
Christie et al.

(10) Patent No.: US 7,316,859 B2
(45) Date of Patent: Jan. 8, 2008

(54) STORAGE SYSTEM AND METHOD FOR SUPPLYING HYDROGEN TO A POLYMER MEMBRANE FUEL CELL

(75) Inventors: Gervase Maxwell Christie, Buffalo, NY (US); James Joseph Volk, Clarence, NY (US); Timothy James Fagan, Olathe, KS (US)

(73) Assignee: Praxair Technology, Inc., Danbury, CT (US)

( * ) Notice: Subject to any disclaimer, the term of this patent is extended or adjusted under 35 U.S.C. 154(b) by 464 days.

(21) Appl. No.: 10/600,605

(22) Filed: Jun. 23, 2003

(65) Prior Publication Data

US 2004/0258965 A1 Dec. 23, 2004

(51) Int. Cl.
*H01M 2/14* (2006.01)
*H01M 8/04* (2006.01)
*F15C 1/04* (2006.01)

(52) U.S. Cl. .................. 429/38; 429/19; 429/39; 429/17; 429/30; 137/825; 137/109

(58) Field of Classification Search .............. 429/34, 429/38, 39, 25, 30, 17, 19; 137/51, 804, 137/815, 825, 109; 141/193, 198, 202; 239/337, 239/340
See application file for complete search history.

(56) References Cited

U.S. PATENT DOCUMENTS 6,503,649 B1   1/2003   Czajkowski et al. ......... 429/23
6,555,989 B1   4/2003   Pearson ....................... 320/101
6,756,140 B1 * 6/2004   McAlister .................... 429/20
6,792,981 B1 * 9/2004   Manning et al. .............. 141/3
2004/0018632 A1 * 1/2004   Shabana et al. ............ 436/144
2005/0145505 A1 * 7/2005   Fairlie et al. ............... 205/637

FOREIGN PATENT DOCUMENTS

JP     04-115470    * 4/1992

* cited by examiner

Primary Examiner—Raymond Alejandro
(74) Attorney, Agent, or Firm—David M. Rosenblum

(57) ABSTRACT

A hydrogen storage system and method having a main hydrogen storage site that contains a sufficient amount of hydrogen for a fuel cell employing a polymer membrane to generate power in accordance with a predetermined electrical power requirement. A main storage site is provided to store and supply hydrogen to meet the electrical power requirement for the fuel cell. An auxiliary hydrogen storage site contains a sufficient amount of hydrogen to allow the fuel cell to operate on a scheduled basis that is required to maintain the polymer membrane hydrated. A manifold connects the main and auxiliary hydrogen storage sites and has an outlet to deliver hydrogen to the fuel cell. The manifold allows the auxiliary hydrogen storage site to be renewed independently of the main storage site and has a flow control network to allow the fuel cell to draw hydrogen from the auxiliary hydrogen storage site for maintenance purposes without utilization of the hydrogen from the main hydrogen storage site.

10 Claims, 2 Drawing Sheets

STORAGE SYSTEM AND METHOD FOR SUPPLYING HYDROGEN TO A POLYMER MEMBRANE FUEL CELL

FIELD OF THE INVENTION

The present invention relates to a system and method for supplying hydrogen to a polymer membrane fuel cell to power a load and that is operated on a scheduled basis to maintain the polymer membrane in a hydrated condition. More particularly, the present invention relates to such a system and method in which the hydrogen used for maintenance purposes is stored in and supplied from an auxiliary gas cylinder.

BACKGROUND OF THE INVENTION

Fuel cells provide an environmental friendly method for generating electricity for a variety of purposes. One major purpose is to provide a back-up supply of electricity in case of power outages. As can be appreciated, if hydrogen is used as a fuel, there are less pollutants produced than in the case of back-up electrical generation that involve the use of internal combustion engines.

Where fuel cells are used to supply back-up power and for other uses, a sufficient amount of hydrogen must be stored to allow the fuel cell to supply a specific amount of electrical energy for the particular load involved. For instance, the specification might be to supply 5 kilowatts of power for 8 hours. Storage of hydrogen for fuel cells that utilize polymer membranes is complicated by the fact that such a fuel cell must be powered up in accordance with a schedule, for instance, every month for 15 minutes, in order to ensure that the membrane remains properly hydrated. The problem with this is that the scheduled maintenance operation of the fuel cell will consume hydrogen that otherwise must be on hand to ensure that the fuel cell will be able to meet its intended power requirements.

As may be appreciated, the continuing requirement to recharge a bulk hydrogen supply is a logistically complex if not expensive proposition. For instance, in order to recharge a bulk hydrogen supply, a tube trailer or other heavy equipment is required. Further expense may be produced where the fuel cell is situated in a geographically remote location. The present invention overcomes this problem by providing a hydrogen supply system and method for a fuel cell employing a polymer membrane that does not require the use of heavy equipment and the like to insure that there is sufficient hydrogen banked for later use by the fuel cell.

SUMMARY OF THE INVENTION

The present invention provides a hydrogen storage system for supplying hydrogen to a fuel cell employing a polymer membrane to power a load in accordance with a predetermined electrical power requirement and to maintain the polymer membrane in a hydrated condition.

In accordance with the present invention, a main hydrogen storage site is provided. The main hydrogen storage site is sized to contain at least a sufficient amount of hydrogen for the fuel cell to generate the predetermined electrical power requirement. An auxiliary hydrogen storage site is sized to contain an amount of hydrogen that is at least sufficient to allow the fuel cell to operate on a scheduled basis to maintain the polymer membrane in a hydrated condition. A manifold connects the main hydrogen storage site and the auxiliary hydrogen storage site and has an outlet to deliver the hydrogen to the fuel cell. The manifold is configured to allow the auxiliary hydrogen storage site to be renewed independently of the main hydrogen storage site. The manifold has a flow control network to allow the fuel cell to draw the hydrogen from the auxiliary hydrogen storage site to maintain the polymer membrane in the hydrated condition, without utilization of the hydrogen from the main storage site.

The flow control network can have pressure regulators configured such that the hydrogen from the auxiliary hydrogen storage site is delivered to the outlet before the hydrogen stored in the main hydrogen storage site. Check valves are provided to prevent the flow of hydrogen between the main and auxiliary hydrogen storage site. Thus, for membrane maintenance purposes, hydrogen is drawn from the auxiliary hydrogen storage site. When the fuel cell is required to power the load, for instance, as power back-up, any remaining hydrogen is drawn from the auxiliary hydrogen storage site and then from the main hydrogen storage site. Since the amount of hydrogen stored in the auxiliary site is sufficient for the maintenance operation, there will always be a sufficient amount of hydrogen in the main storage site to allow the fuel cell to meet its power requirements.

The main hydrogen storage site can consist of two banks of compressed gas cylinders and the auxiliary hydrogen storage site can be a single compressed gas cylinder. In such case, the pressure regulators can be first, second and third pressure regulators associated with a single compressed cylinder and one and the other of the two banks of the compressed gas cylinders, respectively. An outlet pressure regulator is provided to adjust the outlet pressure of the hydrogen at the outlet of the manifold. The first pressure regulator is set at a higher pressure than the second pressure regulator which is in turn set at a higher pressure than the third pressure regulator. As a result, the hydrogen is first drawn from the single compressed gas cylinder and then the one of the two banks of the compressed gas cylinders. After the pressure has sufficiently dropped in the one bank of compressed gas cylinders, then the other of the two banks of compressed gas cylinders is used to deliver the hydrogen. This all occurs automatically without the use of any electronic controls or expensive remotely operated valves.

The two banks of cylinders can be connected to the manifold to commonly feed the manifold with hydrogen. In such case, the pressure regulators are first and second pressure regulators associated with the single compressed gas cylinder and the two banks of compressed gas cylinders, respectively. The first pressure regulator is set to a higher pressure than the second pressure regulator such that the hydrogen is first drawn from the single compressed gas cylinder to the outlet.

In another embodiment, the main hydrogen storage site can be a composite, carbon-fiber wrapped compressed gas cylinder. The auxiliary storage site is a single compressed gas cylinder. The pressure regulators are a first pressure regulator associated with a single compressed gas cylinder and second and third pressure regulators associated with the composite, fiber-wrapped compressed gas cylinder. An outlet pressure regulator is provided to the outlet pressure of the hydrogen at the outlet of the manifold. The second and third pressure regulators are situated in an in-line relationship to regulate pressure of the hydrogen supplied from the composite, carbon-fiber wrapped compressed gas cylinder to level below that regulated by the first pressure regulator. As a result, hydrogen is first drawn from the single compressed gas cylinder to the outlet. As can be appreciated, two pressure regulators are required in case of a composite, carbon-fiber wrapped compressed gas cylinder which can be designed to obtain the hydrogen at over 5,000 lbs.

In another aspect, the present invention provides a method for supplying a hydrogen to a fuel cell employing a polymer membrane to power a load in accordance with a predetermined electrical power requirement and to maintain the polymer membrane in a hydrated condition. Hydrogen is supplied to the fuel cell to generate electricity to power the load from a main hydrogen storage site charged with at least a sufficient amount of hydrogen for the fuel cell to generate the predetermined electrical power requirement. Hydrogen is also supplied to the fuel cell on a scheduled basis from an auxiliary hydrogen storage site charged with an amount of hydrogen that is at least sufficient to maintain the polymer membrane hydrated. The auxiliary hydrogen storage site is periodically renewed so that it remains charged with the amount of hydrogen to allow the fuel cell to operate on the scheduled basis without drawing hydrogen from the main hydrogen storage site.

The hydrogen can be delivered from both the main hydrogen storage site and the auxiliary hydrogen storage site to a manifold having an outlet to the fuel cell. The manifold can have check valves to present the flow of hydrogen from the auxiliary hydrogen storage site to the main hydrogen storage site and vice-versa. The hydrogen from the auxiliary hydrogen storage site is delivered to the manifold at a higher pressure than that of the main hydrogen storage site so that the hydrogen will be first drawn from the auxiliary hydrogen storage site.

The auxiliary hydrogen storage site can be a single compressed gas cylinder and the auxiliary hydrogen storage site can be renewed by periodically replacing the single compressed gas cylinder. Where a manifold is employed, the auxiliary hydrogen storage site can be renewed by periodically disconnecting the single compressed gas cylinder from the manifold and replacing the single compressed gas cylinder.

BRIEF DESCRIPTION OF THE DRAWINGS

While the specification concludes with claims distinctly pointing out the subject matter that applicants regard as their invention it is believed that the invention will be better understood when taken in connection with the accompanying drawings in which:

DETAILED DESCRIPTION

Figure 1:
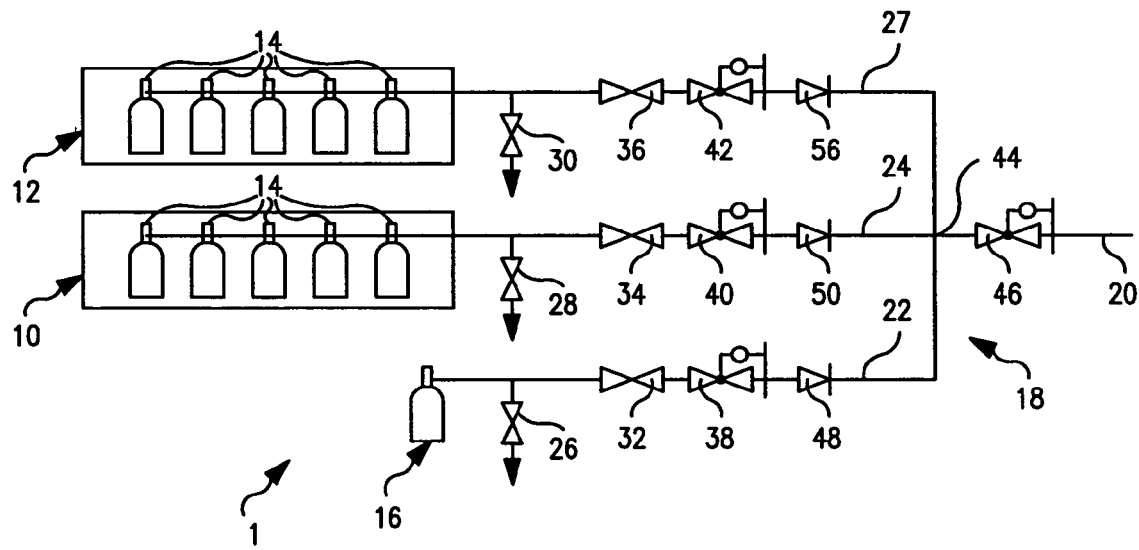
FIG. 1 is a schematic illustration of a hydrogen supply system for carrying out a method in accordance with the present invention.

With reference to FIG. 1, a hydrogen storage system 1 is illustrated for supplying hydrogen to a polymer membrane fuel cell (not illustrated). The polymer membrane fuel cell is employed to generate electricity to power a load in accordance with the predetermined electrical power requirement, for instance, as back-up power. The polymer membrane fuel cell also operates on a scheduled predetermined basis to maintain the polymer membrane in a hydrated condition. The fuel cell itself is activated for the foregoing purposes by known automated means that activate the fuel cell upon the occurrence of, for instance, a power upset or on the scheduled basis to maintain the polymer membrane.

Hydrogen storage system 1 is provided with first and second banks 10 and 12 of compressed gas cylinders 14 that are connected to one another. The resultant main hydrogen storage site is sized to contain at least a sufficient amount of hydrogen for the fuel cell to generate the predetermined electrical power requirement. As may be appreciated, more hydrogen can be stored to provide a factor of safety. An auxiliary hydrogen storage site is formed by a single compressed gas cylinder 16 that is sized to contain an amount of hydrogen that is at least sufficient to allow the fuel cell to operate on the scheduled basis. Again, more hydrogen could be stored in compressed gas cylinder 16 to provide a factor of safety.

First and second banks of hydrogen cylinders 10 and 12 and auxiliary compressed gas cylinder 16 are connected to a manifold 18 having an outlet 20 to the fuel cell. Manifold 18 has inlet lines 22, 24 and 27 that are connected to compressed gas cylinder 16 and first and second storage bank of hydrogen cylinders 10 and 12, respectively. Lines 22, 24 and 27 are provided with line purge valves 26, 28 and 30 to allow inlet lines 22, 24 and 27 to be purged upon removal of compressed gas cylinder 16 or first and second hydrogen storage banks 10 and 12. Additionally shutoff valves 32, 34 and 36 are provided for such purposes. For instance, if compressed gas cylinder 16 is to be removed, valve 32 is closed and line purge valve 26 is open. Thereafter, compressed gas cylinder 16 is removed from manifold 18 by simply uncoupling any one of a number of known pressure fittings that can be utilized for such purpose.

Manifold 18 is also provided with first, second and third pressure regulators 38, 40 and 42 which are interposed between a junction 44 and an outlet pressure regulator 46. First pressure regulator 38 is set at the highest pressure, for instance 90 psi so that hydrogen will first be drawn from compressed gas cylinder 16. Second pressure regulator 40 which is associated with hydrogen storage bank 10 is set at a pressure of for instance 75 psi so that hydrogen will next be drawn from first hydrogen storage bank 10. Third pressure regulator 42 is set at the lowest pressure, for instance, 60 psi so that hydrogen will next be drawn from second hydrogen storage bank 12. First, second and third check valves 48, 50 and 56 are provided to prevent flow between compressed gas cylinder 16, first hydrogen storage bank 10 and second hydrogen storage bank 12.

Assuming that there is no requirement for hydrogen from the main storage site provided by first and second hydrogen storage banks 10 and 12, the scheduled operation of the fuel cell will cause a solenoid valve within the fuel cell (not illustrated) to open and the fuel cell will first draw hydrogen from the compressed gas cylinder 16. Since pressure regulator 38 is set at the highest pressure, second and third check valves 50 and 56 will shut off the flow within the legs of the manifold associated with first hydrogen storage bank 10 and second hydrogen storage bank 12. Outlet pressure regulator 46 will regulate the pressure down to the supply of pressure required by the fuel cell, for instance 50 psi. Since the amount of hydrogen that will be consumed for purposes of maintaining the polymer membrane in an operation condition, periodically, compressed gas cylinder 16 can be removed in the manner described above and renewed by replacement with a fresh gas cylinder.

Although not a preferred mode of operation, manifold 18 could be designed to allow hydrogen storage to compressed gas cylinder 16 to simply be refilled in place by an appropriate fitting installed on inlet line 22.

Assuming that a requirement exists for the fuel cell to power the load and that the pressure within compressed gas cylinder 16 has not first fallen to the pressure set in second pressure regulator 40, hydrogen will be drawn from compressed gas cylinder 16 until the pressure drops to below the pressure set point of second pressure regulator 40. At such point, pressure from first hydrogen storage bank 10 will cause first check valve 48 to close and allow second check valve 50 to open. When first hydrogen storage bank 10 drops below the pressure set for third pressure regulator 42, second check valve 50 will close and hydrogen will be drawn from second hydrogen storage bank 12. First and second hydrogen banks 10 and 12 are refilled or replaced along with compressed gas cylinder 16 after the depletion thereof.

As may be appreciated, a mode of operation of the present invention could be conducted without pressure regulators 38, 40 and 42. In such case, hydrogen could be stored at the highest pressure and compressed gas cylinder 16 at a lower pressure in first hydrogen storage bank 10 and yet at a lower pressure in second hydrogen storage bank 12. This would not be preferred due to the complexity that would be introduced into filling operations and further if the hydrogen were not pressure regulated, a greater amount of hydrogen would have to be stored. Also possible is the use of pressure sensors and remotely activated valves to accomplish such switch over on the depletion of compressed gas cylinder 16 and then first and second hydrogen storage banks 10 and 12.

Figure 2:
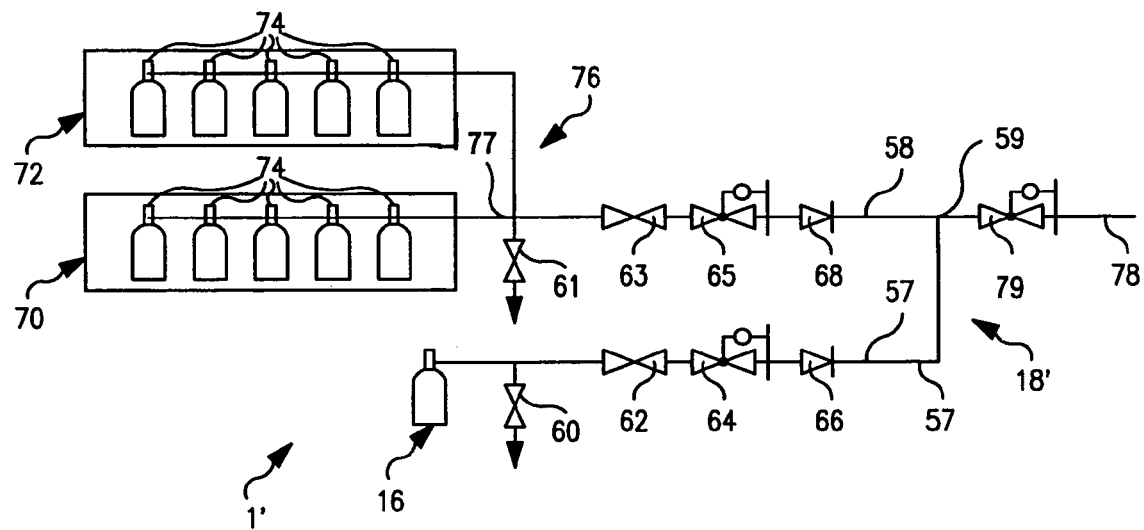
FIG. 2 is an alternative embodiment to FIG. 1.

With reference to FIG. 2 an alternative hydrogen supply system 1' is illustrated. A manifold 18' is provided that has first and second inlet lines 57 and 58 that join at a junction 59. As in the previous embodiment line purge valves 60 and 61 are provided along with shut off valves 62 and 63. Flow control is provided by first and second pressure regulators 64 and 65. First pressure regulator 64 is set at a higher pressure, for instance, at 80 psi and second pressure regulator 65 is set at a lower pressure, for instance, 60 psi, so that hydrogen will initially be drawn from compressed gas cylinder 16. Check valves 66 and 68 are provided to prevent flow between compressed gas cylinder 16 and first and second hydrogen storage banks 70 and 72, respectively. First and second hydrogen storage banks 70 and 72 of compressed gas cylinders 74 are connected to a subsidiary manifold 76 that joins into inlet line 58 at junction 77. Hydrogen is supplied through an outlet line 78 after having been first reduced in pressure by an outlet pressure regulator 79. As in the prior embodiment, the higher pressure set point of first pressure regulator 64 over that of second pressure regulator 65 will cause hydrogen to be first drawn from compressed gas cylinder 16 which can be replaced for renewal purposes.

Figure 3:
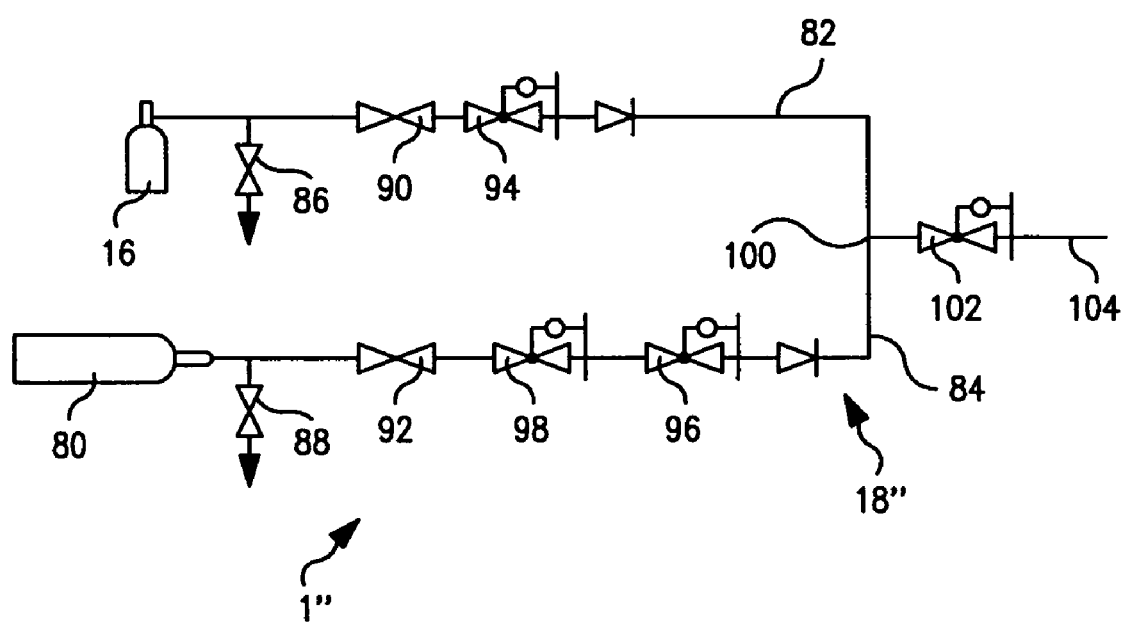
FIG. 3 is an alternative embodiment of FIG. 1.

With reference to FIG. 3 a further hydrogen supply system 1" is illustrated. In this embodiment, the auxiliary storage site is compressed gas cylinder 16 in which hydrogen stored with a pressure at about 2200 psig. The main hydrogen storage site is provided by a composite carbon-fiber wrapped composite cylinder 80 that stores hydrogen at about 6000 psig. A manifold 18" is provided having an inlet line 82 for hydrogen from compressed gas cylinder 16 and an inlet line 84 for composite cylinder 80. As in previous examples, lines 82 and 84 are provided with line purge valves 86 and 88 and shutoff valves 90 and 92. A first pressure regulator 94 is provided to preferentially to draw hydrogen from compressed gas cylinder 16. It can have a higher pressure setting of about 75 psi. Second and third pressure regulators 96 and 98 are provided for composite cylinder 80. Since the pressure within composite cylinder 80 is about 6000 psig, third pressure regulator 98 is used to reduce the pressure to 2000 psi and second pressure regulator 96 is used to further reduce the pressure below the level of that of first pressure regulator 94, for instance 60 psi. The hydrogen flows to a junction 100. Pressure is then further reduced by an outlet pressure regulator 102 and hydrogen flows from an outlet 104.

While the present invention has been described with reference to preferred embodiments, as will occur to those skilled in the art, numerous changes, additions and omissions may be made without departing from the spirit and scope of the present invention. The present invention is set forth in the claims.

What is claimed is:

1. A hydrogen storage system for supplying hydrogen to a fuel cell employing a polymer membrane, the fuel cell consuming part of the hydrogen to power a load in accordance with a predetermined electrical power requirement and a further part of the hydrogen to operate on a scheduled basis when not powering the load to maintain the polymer membrane in a hydrated condition, said system comprising:
   a main hydrogen storage site to contain the part of the hydrogen for the fuel cell to generate the predetermined electrical power requirement;
   an auxiliary hydrogen storage site to contain the further part of the hydrogen to allow said fuel cell to operate on a scheduled basis to maintain the polymer membrane in the hydrated condition;
   a manifold connected to the main hydrogen storage site and the auxiliary hydrogen storage site and having an outlet to deliver the hydrogen to the fuel cell;
   the manifold being configured to allow the auxiliary hydrogen storage site to be renewed independently of the main hydrogen storage site; and
   the manifold having a flow control network configured such that said fuel cell draws hydrogen from the auxiliary hydrogen storage site to maintain the polymer membrane in the hydrated condition without utilization of the hydrogen from the main hydrogen storage site.

2. The hydrogen storage system of claim 1, wherein the flow control network has pressure regulators configured such that the hydrogen from the auxiliary hydrogen storage site is delivered to the outlet before the hydrogen stored in the main hydrogen storage site and check valves to prevent the flow of hydrogen between the main and auxiliary hydrogen storage site.

3. The hydrogen storage system of claim 2, wherein:
   said main hydrogen storage site consists of two banks of compressed gas cylinders; and
   said auxiliary hydrogen storage site is a single compressed gas cylinder.

4. The hydrogen storage system of claim 3, wherein:
   the pressure regulators are first, second, and third regulators associated with said single compressed gas cylinder and one and the other of the two banks of the compressed gas cylinders and an outlet pressure regulator to adjust outlet pressure of the hydrogen at the outlet of the manifold; and
   the first pressure regulator is set at a higher pressure than the second pressure regulator which is in turn set at a higher pressure than the third pressure regulator, such that the hydrogen is first drawn from the single compressed gas cylinder, the one of the two banks of compressed gas cylinders and then the other of the two banks of compressed gas cylinders.

5. The hydrogen storage system of claim 3, wherein:
   the two banks of compressed gas cylinders are connected to the manifold to commonly feed the manifold with hydrogen; and
   the pressure regulators are first and second pressure regulators associated with the single compressed gas cylinder and the two banks of compressed gas cylinders, respectively; and the first pressure regulator is set at a higher pressure than the second pressure regulator such that the hydrogen is first drawn from the single compressed gas cylinder to the outlet.

6. The hydrogen storage system of claim 2, wherein:
the main hydrogen storage site is a composite, carbon-fiber wrapped compressed gas cylinder;
the auxiliary hydrogen storage site of the hydrogen storage bank is a single compressed gas cylinder; and
the pressure regulators are a first pressure regulator associated with the single compressed gas cylinder, second and third second pressure regulators associated with the composite, carbon-fiber wrapped compressed gas cylinder, and an outlet pressure regulator to adjust outlet pressure of the hydrogen at the outlet of the manifold;
the second and third pressure regulators being situated in an in line relationship to regulate pressure of the hydrogen supplied from the composite, carbon-fiber wrapped compressed gas cylinder to a level below that regulated by the first pressure regulator such that the hydrogen is first drawn from the single compressed gas cylinder to the outlet.

7. A method of supplying hydrogen to fuel cell employing a polymer membrane, the fuel cell consuming part of the hydrogen to power a load in accordance with a predetermined electrical power requirement and a further part of the hydrogen to operate on a scheduled basis when not powering the load to maintain the polymer membrane in a hydrated condition, said method comprising:
supplying the part of the hydrogen to the fuel cell to generate electricity to power the load from a main hydrogen storage site;
supplying the further part of the hydrogen to the fuel cell on the scheduled basis from an auxiliary hydrogen storage site; and
periodically renewing the auxiliary hydrogen storage site so that it remains charged with the further part of the hydrogen to allow the fuel cell to operate on the scheduled basis without drawing hydrogen from the main hydrogen storage site.

8. The method of claim 7, wherein:
the hydrogen is delivered from both the main hydrogen storage site and the auxiliary hydrogen storage site to a manifold having an outlet to the fuel cell;
the manifold has check valves to prevent the flow of hydrogen from the auxiliary hydrogen storage site to the main hydrogen storage site and vice-versa;
the hydrogen from the auxiliary hydrogen storage site is delivered to the manifold at a higher pressure than that of the main hydrogen storage site such that the hydrogen will be first drawn from the auxiliary hydrogen storage site.

9. The method of claim 7, wherein the auxiliary hydrogen storage site is a single compressed gas cylinder and the auxiliary hydrogen storage site is renewed by periodically replacing the single compressed gas cylinder.

10. The method of claim 8, wherein the auxiliary hydrogen storage site is a single compressed gas cylinder and the auxiliary hydrogen storage site is renewed by periodically disconnecting the single compressed gas cylinder from the manifold and replacing the single compressed gas cylinder.

* * * * *